(12) United States Patent
Arora et al.

(10) Patent No.: US 7,506,277 B1
(45) Date of Patent: Mar. 17, 2009

(54) METHOD AND MECHANISM FOR IMPLEMENTING DFM AWARE CELLS FOR AN ELECTRONIC DESIGN

(75) Inventors: Rajan Arora, Faridabad (IN); Umesh Sisodia, Noida (IN); Anurag Jain, Firozabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 128 days.

(21) Appl. No.: 11/485,039

(22) Filed: Jul. 11, 2006

Related U.S. Application Data

(60) Provisional application No. 60/704,192, filed on Jul. 28, 2005.

(51) Int. Cl.
*G06F 17/50* (2006.01)
*G06F 9/45* (2006.01)

(52) U.S. Cl. .................. 716/1; 716/5; 716/9; 716/10; 716/11

(58) Field of Classification Search .............. 716/5, 716/9, 10, 11, 1
See application file for complete search history.

(56) References Cited

U.S. PATENT DOCUMENTS

| | | | |
|---|---|---|---|
| 2002/0138813 A1* | 9/2002 | Teh et al. ................. | 716/5 |
| 2003/0200513 A1* | 10/2003 | Bergman Reuter et al. ..... | 716/4 |
| 2005/0188338 A1* | 8/2005 | Kroyan et al. ............. | 716/9 |
| 2007/0083847 A1* | 4/2007 | Mansfield et al. ........... | 716/21 |

\* cited by examiner

*Primary Examiner*—Thuan Do
*Assistant Examiner*—Magid Y Dimyan
(74) *Attorney, Agent, or Firm*—Vista IP Law Group, LLP

(57) ABSTRACT

An improved method, system, computer program product, and electronic design structures which provides the flexibility to IC designers to be able to relax the design rules to increase the yield and improve the layout productivity is disclosed. In some disclosed approaches, automated interactive aids and batch tools are provided which can assist in optimizing the final layouts for yield at the initial placement and/or routing stages for optimizing yield. Provided in some disclosed approaches are automated capability to layout designers at the mos devices level to configure mos devices as per different DFY recommendations from the foundry without negative effects on the overall chip area (or cell size). The design rules may be relaxed selectively on an instance basis and wherever possible or desirable.

20 Claims, 8 Drawing Sheets

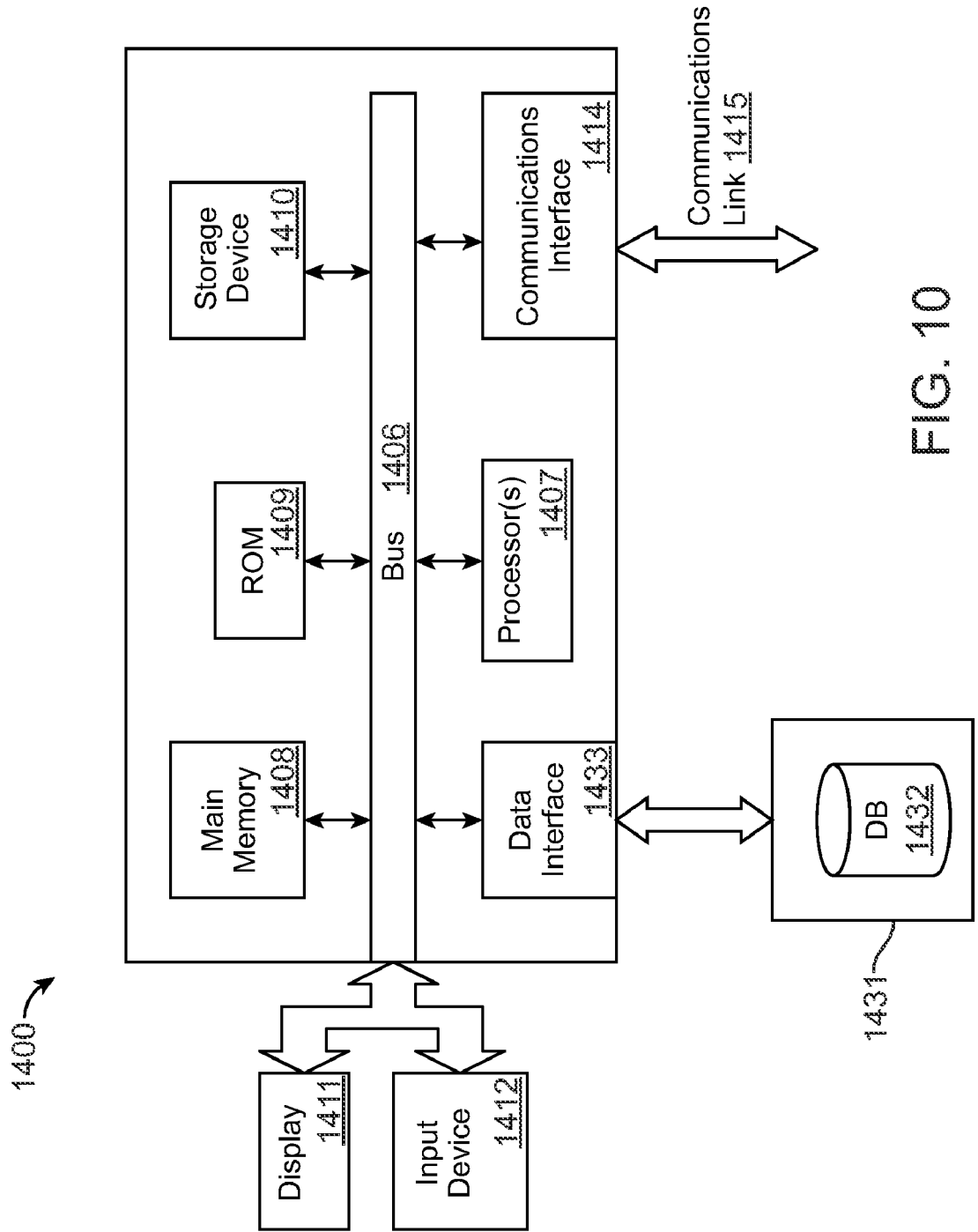

METHOD AND MECHANISM FOR IMPLEMENTING DFM AWARE CELLS FOR AN ELECTRONIC DESIGN

CROSS-REFERENCE TO RELATED APPLICATION

The present application claims the benefit of U.S. Provisional Application Ser. No. 60/704,192, filed on Jul. 28, 2005, which is hereby incorporated by reference in its entirety.

BACKGROUND AND SUMMARY

The invention relates to technology for implementing electronic design automation ("EDA") tools and electronic designs using EDA tools.

An IC is a small electronic device typically formed from semiconductor material. Each IC contains a large number of electronic components, e.g., transistors, that are wired together to create a self-contained circuit device. The components and wiring on the IC are materialized as a set of geometric shapes that are placed and routed on the chip material. During placement, the location and positioning of each geometric shape corresponding to an IC component are identified on the IC layers. During routing, a set of routes are identified to tie together the geometric shapes for the electronic components.

Once the layout is finished, it is verified to make sure it satisfies the design rules, which are typically provided by the foundry that is to manufacture the IC device. This verification process is called Design Rule Check (DRC). The design rules are a set of rules regarding minimum distances, sizes, enclosure criteria, among other constraints for implementing the layout. The rules are not specifically designed for any particular IC device, but are a compiled set of rules that are applied to all designs to be processed by that fabrication facility for a particular process technology. As such, the design rules are typically configured more conservatively than needed for every single element on an IC. Therefore, strict application of the rules may actually decrease yield for manufacturing of the IC device if portions of the rules are stricter than needed for every given component on an IC.

As the semiconductor industry moves to process technologies of 90 nanometer and below, IC design flows require tools that can carefully consider yield and manufacturability. The emerging state of nanometer semiconductor production demands that designers take yield into consideration up front, rather than leaving it as an expensive and time-consuming afterthought. This has given birth to popular terms like DFM (Design for Manufacturability) and DFY (Design for Yield).

A possible solution that takes yield into account during the IC design flow is to flatten parameterized devices (PMOS/NMOS structures) in the layout to be able to apply preferred rules (DFM Rules) from the foundry on individual structures or local areas. One problem with this approach is that the user can lose backannotation of the impacted devices with their corresponding schematics. Since the parameterized devices get flattened, it creates problems in Engineering Change Order ("ECO") flow (e.g., using Update Layout Parameters) or while picking any later updates from the schematic automatically. The designer also loses information needed to quickly perform Layout vs Schematic ("LVS") later in the flow.

Another approach is to maintain separate masters of parameterized devices having different sets of DFM rules. Then, the user can replace masters of specific instances with the desired ones. A problem with this approach is that it can cause great difficulties and costs to maintain different masters of the same device just for having different DFM rules. The user will also need to put extra efforts to maintain correct binding with the schematic for correct backannotation from layout to schematic graphically.

To address these issues (among others), embodiments of the present invention provide an improved method, system, computer program product, and electronic design structures which provides the flexibility to IC designers to be able to relax the design rules to increase the yield and improve the layout productivity. In some embodiments, automated interactive aids and batch tools are provided which can assist in optimizing the final layouts for yield at the initial placement and/or routing stages for optimizing yield. Provided in some embodiments are automated capability to layout designers at the mos devices level to configure mos devices as per different DFY recommendations from the foundry without negative effects on the overall chip area (or cell size). The design rules may be relaxed selectively on an instance basis and wherever possible or desirable.

BRIEF DESCRIPTION OF DRAWINGS

FIG. 10 illustrates an example computing architecture with which embodiments of the invention may be practiced.

DETAILED DESCRIPTION

Figure 1:
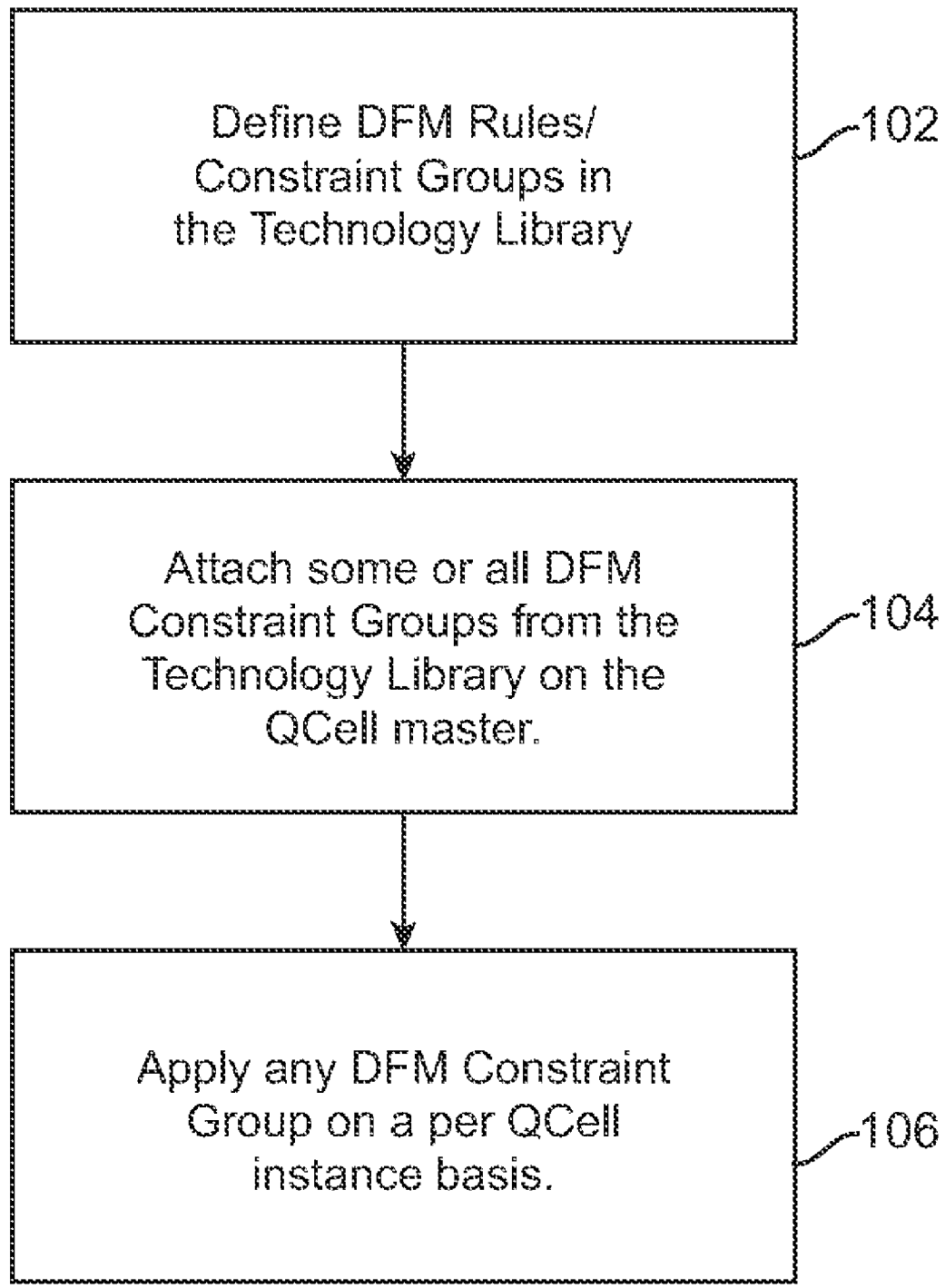
FIG. 1 illustrates a process for relaxing design rules according to some embodiments of the invention.

Embodiments of the present invention provide an improved method, system, computer program product, and electronic design structures which provide the flexibility to IC designers to be able to relax the design rules to increase the yield and improve the layout productivity. The design rules may be relaxed selectively on an instance basis and wherever possible or desirable.

If the entire design/layout is made by using the minimum possible dimensions, using, for example, process specific DRC values like minSpacing, minEnclosure etc., then yield can be considerably lower due to various fabrication process complications in small devices. One way to improve the yield is to relax DRC rules, i.e. by using slightly higher values as per DFY recommendation, also called preferred rules, from the foundry for a specific process technology. However, it is not normally possible to relax DRC rules in each and every portion of the layout because it will lead to increase in the overall die area, thus reducing the number of dies per wafer. Such a scenario would also negatively affect profitability of the enterprise.

In real-world designs, each portion of the design is not always equally dense and critical to other portions of the design. For example, some portion of the design may have vacant spaces or may be less critical. In such vacant spaces or depending on the criticality of the portion of the design, the design rules can be relaxed at device instances level to increase the chances of high yield.

One approach for relaxing design rules in some embodiments of the invention is to use intelligent design cells, such as intelligent parameterized cells ("Pcells") or Quick Cells ("Qcells").

A pcell is a programmable layout which allows users to specify their own parameters like transistor size and finger number. PCells are a key element of accelerated and automated custom layout for automatic generation of transistor devices, e.g., in a connectivity and constraint driven methods. Pcells can be created either graphically or using SKILL code. Skill is a programming language in some EDA environments. An approach for creating and implementing pcells is to use the commercially available EDA tool Cadence® Pcell Generator, available from Cadence Design Systems, Inc. This tool includes the GTE (Graphical Technology Editor) software mechanism, which allows the user to enter process design rules graphically, storing it into a proprietary database and which provides a graphical Pcell editor to define Pcells.

QCells are a form of parameterized cells for EDA design environment which do not need any SKILL programming and offer a quick menu driven method of transistor device generation. A commercially available EDA tool offering Qcells is the Virtuoso XL tool available from Cadence Design Systems, Inc. of San Jose, Calif.

For the purposes of illustration only, and not by way of limitation, this document will describe the invention in the context of DFM Intelligent Qcells. It is noted, however, that the principles disclosed herein may be applied to any other type of cell structure used for EDA design activities, such as Pcells.

The diagram of FIG. 1 shows the actions involved in defining DFM Intelligent feature in Qcells according to one embodiment of the invention.

At 102, the method defines DFM rules/constraint groups in a technology library. The present invention allows one to define alternate set of design rules in the technology file apart from the minimum DRC rules. These rules are being termed as DFM Rules (or DFM Constraints) and their individual sets as DFM Rule Sets (or DFM Constraint Groups). The DFM Rules and Constraint Groups can be saved in a technology library using a graphical user interface, e.g., a Technology File Manager GUI.

At 104, some or all of the DFM rules/constraint groups are attached to a QCell master. The rules, once defined in a file (e.g., a technology file or library), can be selectively applied to QCell masters. For this purpose a DFM Constraint Group tab can be created (e.g., by forming a new tab in a form to Install Qcells). The user can then select some or all of the DFM Constraint Groups defined in the techfile. Once selected, these Constraint Groups are stored as a new Class Parameter "dfmConstrGrp" on the specified Qcell.

Any DFM constraint group can be applied on a per QCell instance basis (106). From the stored DFM Constraint Groups on the QCell master, the user can specify any one of the Constraint Groups on the instance of the QCell master for one or more rules available for override. The application of this changed DFM Constraint Group value on the instance would impact the actual geometry of the instance. The applicable DFM Rules are stored on the QCell instance as a new Formal Parameter "instDFMVal".

The following sections provide more details of the storing DFM Rules in the technology file and also the method to apply these rules on the QCell masters and their Instances.

Storing DFM Design Rules in Technology Library Using Technology File Manager

The DFM rule values are technology specific. Each DFM Rule/Constraint Group should provide a different level of relaxation as compared to the corresponding DRC rule(s). The actual values for these DFM rules are specified by foundry for a particular process technology. In one embodiment, it is preferred to store these DFM Constraint Groups as user defined parameters in the techParams( ) section of technology file.

Figure 2:
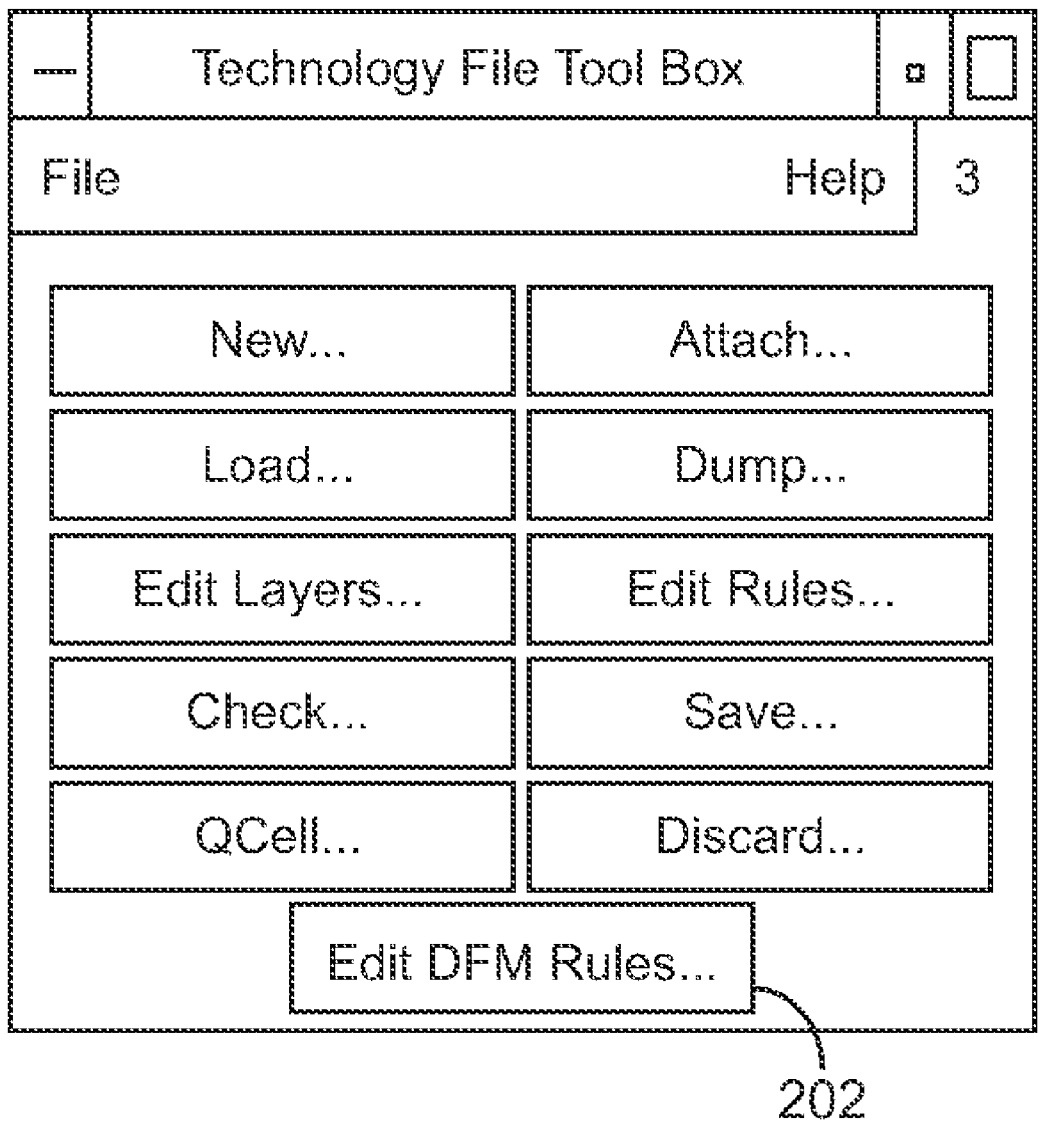
FIG. 2 shows an example approach for using a technology file manager to manage DFM rules according to some embodiments of the invention.

The user can create any number of DFM Constraint Groups and choose the names of these Constraint Groups as per their convenience or the conventions used in their company or organization. Some of the examples can be: highYield, optYield, dfm1, dfm2, etc. These DFM rules can be stored in the technology file using an Edit DFM Rules GUI provided in the Technology File Manager, e.g., as shown in FIG. 2.

Figure 3:
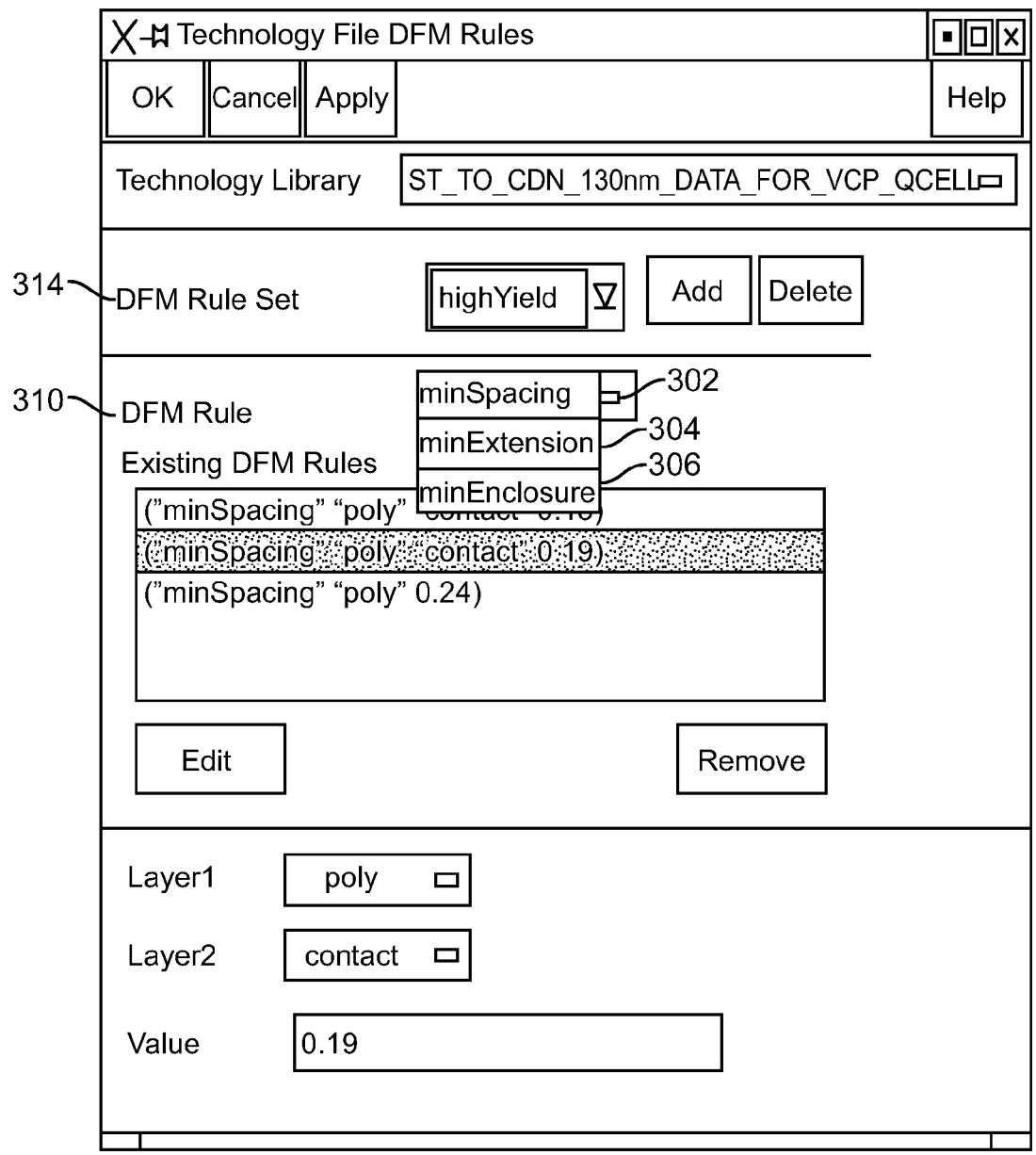
FIG. 3 shows an example approach for editing DFM rules according to some embodiments of the invention.

In this example GUI, the Edit DFM Rules button 202 invokes a GUI for specifying the DFM Rule Sets (Constraint Groups) 314 and DFM Rules (Constraints) 310 (FIG. 3).

In one embodiment, three types of rules are entered through the GUI—minSpacing 302, minExtension 304, and minEnclosure 306. This approach can be extended to the other supported rules as well, including those for processes at 90 nm and below. Users can define any number of such DFM Constraint Groups in the Techfile using the Edit DFM Rules GUI (FIG. 3).

The specified DFM Constraints are saved in the techfile as per the following example format in the techParams section.

```
techParams(
  dfmConstraintGroups ("highYield" "optYield" "dfm1" "dfm2"))
  (highYield
    (("minSpacing"        "Poly"        "Cont"
      0.19)
    ... )); highYield
  (optYield (
    ("minSpacing "Poly" "Cont" 0.22)
    ... )); optYield
  (dfm1 (
    ("minSpacing "Poly" "Cont" 0.24)
    ... ));dfm1
  (dfm2 (
    ("minSpacing "Poly" "Cont" 0.26)
    ... )); dfm2);techParams
```

The techParams section can be used to store the DFM Constraint Groups/Rules. This approach can be used in conjunction with Open Access (OA) 2.2 database version to map to the native Constraint Group objects available in this database version. Open Access is freely available as an open source electronic design database from Silicon Integration Initiative, Inc. (www.si2.org).

Setting DFM Rules on QCell Masters

Figure 4:
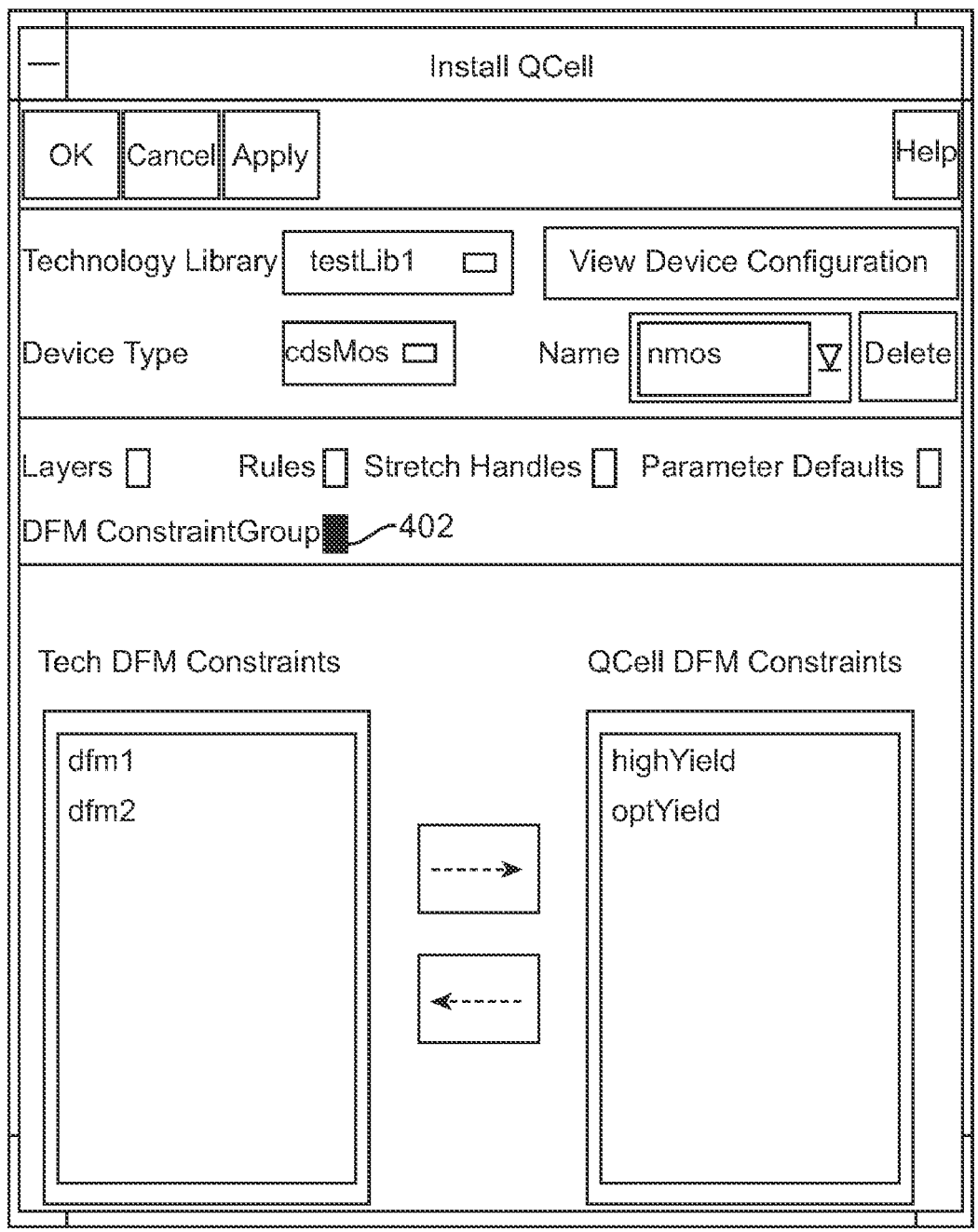
FIG. 4 shows an example approach for editing applying constraint groups to Qcells according to some embodiments of the invention.

From the list of specified DFM Constraint Groups in the techfile, selected constraint groups can be applied to specific Qcells. This can be achieved using the Install QCell GUI as shown in FIG. 4. The DFM Constraint Group tab 402 can be used to select specifically applicable DFM Constraint Groups to the QCell. Once the DFM Constraint Groups of the QCell have been updated using this form, the techfile needs to be saved. However, as an alternative approach and implementation, this dependency of saving this information in the techfile can be removed so that the end users and/or designers do not necessarily need write permissions to their technology library (or PDKs).

The applicable DFM Constraint Groups are saved as a new class parameter "dfmConstrGrp" in the specified QCell. When the ascii dump of the techfile is taken, the new class parameter is also dumped in the QCell definition. This would allow the user to compile the ascii dump of the technology library having QCell Definitions with defined DFM Constraint Groups in a new technology library without specifying the Constraint Groups again.

Overriding DFM Rules on QCell Instances

In one embodiment, by default, at the time of device generation, the transistors have all the composite layers oriented by minimum rules (i.e. foundry/DRC/Default values chosen during QCell installation). When the user instantiates a MOS QCell, its geometry is generated by using the minimum design rules (DRC) defined in the technology file.

Figure 5:
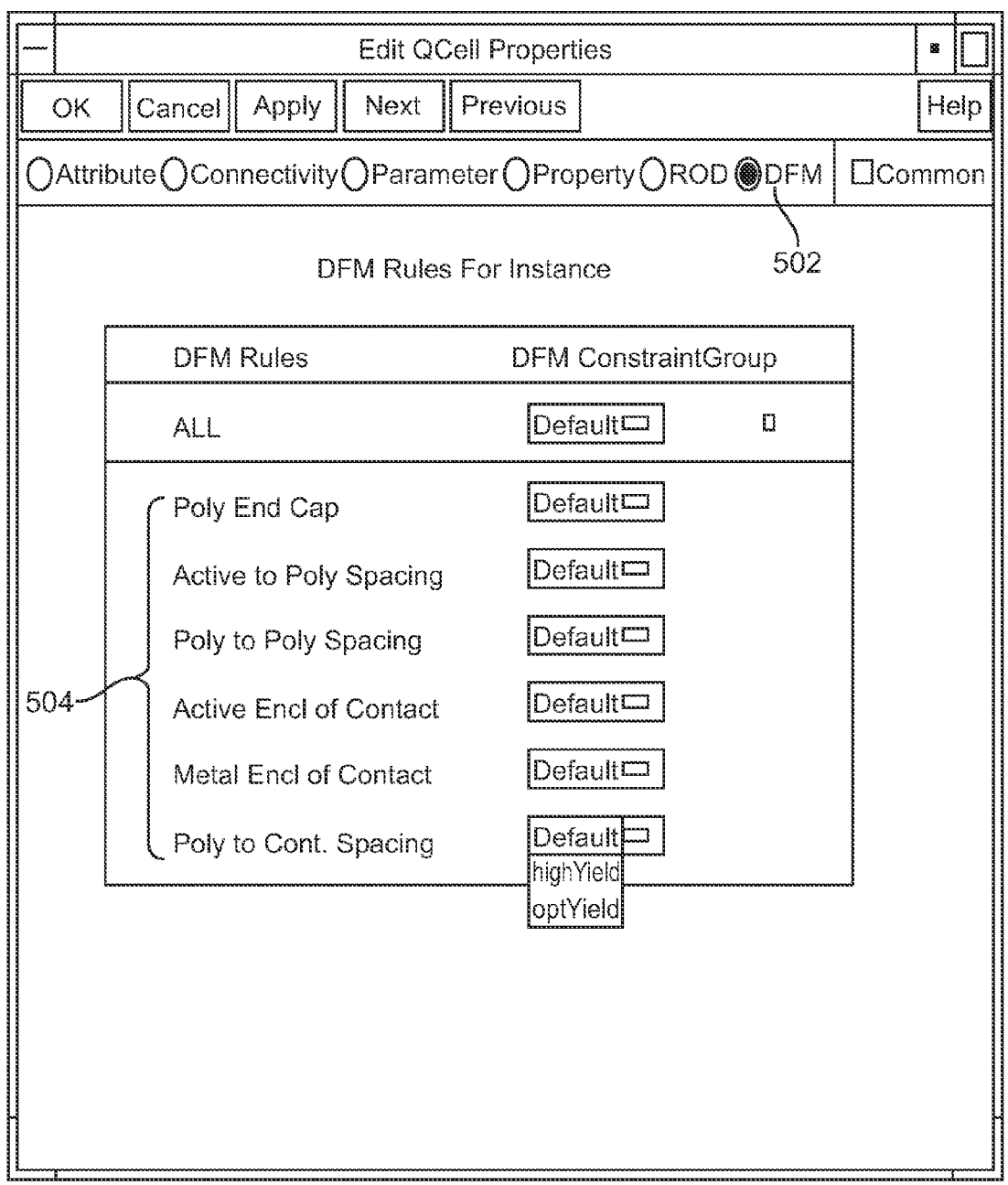
FIG. 5 shows an example approach for editing Qcell properties according to some embodiments of the invention.

At this point, any set of rules can be relaxed on a per instance basis for any device. This can be done using the additional GUI which can be invoked through a DFM Rules button 502 in the Edit QCell Properties GUI as shown in FIG. 5.

Any of the available relaxed DFM rule (from default to highYield, optYield etc.) can be chosen to apply on per instance basis for any device. For every rule, there is an entry Default, which is the default value of the rule from the physicalRules section of the technology library or it corresponds to the Qcell specific values chosen during Qcells' installation. The following are three example spacing rules, two enclosure rules and one extension rules that can be overridden on the QCell instance:

1. Poly End Cap:—This rule lets the user to set the min extension for the gate poly layer.
2. Active to Poly spacing:—This rule allows setting of the min spacing between the gate poly layer and the diffusion layer.
3. Poly to Poly Spacing:—This rule lets the user to set the min spacing between the gate poly layers.
4. Active Enclosure of Contact:—This sets the min enclosure for the diffusion layer enclosing the contact layer.
5. Metal Enclosure of Contact:—This overrides the metal enclosing contact (cut) enclosure values on any or all sides
6. Poly to contact spacing:—This permits setting of the minimum spacing between the gate poly layer and the contact layer.

This list of six rules supported for DFM application on a Mos device is provided for illustration only, and this concept can be extensible to all the rules applicable to a typical mos device. Different DFM Constraint Groups can be chosen for each of the above mentioned rules separately or the same DFM Constraint Group for all the supported rules.

Once these DFM Rules are applied to the QCell Instance, the DFM rules override the corresponding Class Parameter of the QCell master.

FIG. 5 shows the GUI which can be used to apply these DFM rules on a QCell instance. From the values of the DFM rules (refer FIG. 5), a list 504 of six strings is created and is stored as a property "instDFMVal" on the QCell Instance. Reading this property, the QCell Instance geometries are redefined and created according to their corresponding values defined in DFM Constraint Groups in the technology file.

EXAMPLES

Figure 6:
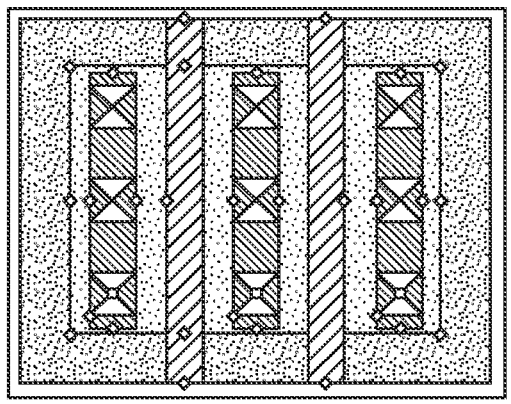
FIG. 6 shows the geometry of an example Qcell instance without application of a DFM rule.
Figure 7:
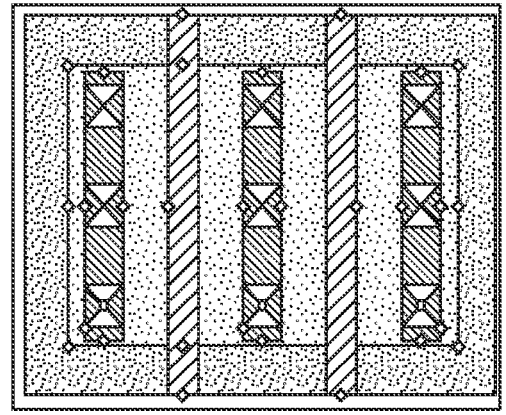
FIG. 7 shows the Qcell instance of FIG. 6 with a modified Poly to Contact Spacing DFM rule.

The present example(s) show the changes in device geometry when the DFM rules are applied to the QCell instance. FIG. 6 shows the geometry of a QCell Instance without application of any DFM Rule. FIG. 7 shows the changed geometry when the value of Poly to Contact Spacing DFM rule is set to highYield, i.e., increased. The new increased value of Poly to Contact spacing is being reflected in the device geometry.

Figure 8:
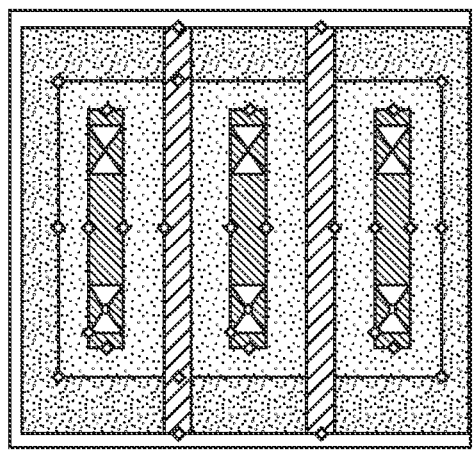
FIG. 8 shows the Qcell instance of FIG. 6 with a modified Poly to Contact Spacing DFM rule and a modified Active Enclosure of Contact rule.

FIG. 8 shows the changed geometry of the QCell instance when both of the Poly to Contact Spacing as well as Active Enclosure of Contact are set to highYield. This automatically updates the number of contacts within the same device width and metal shape, depending on the application of new Active Enclosure of Contact which is slightly mordthan its corresponding DRC value.

DFM Intelligent QCells' Position in the Design Flow

In some embodiments, the inventive DFM concepts can be used for individual Qcell MOS devices which are the building blocks of any complex designs. This can be utilized in the custom layout design flow as an iterative step during automatic layout generation using Gen from Source and Placement to achieve higher levels of optimizations and yield with better layout productivity.

Figure 9:
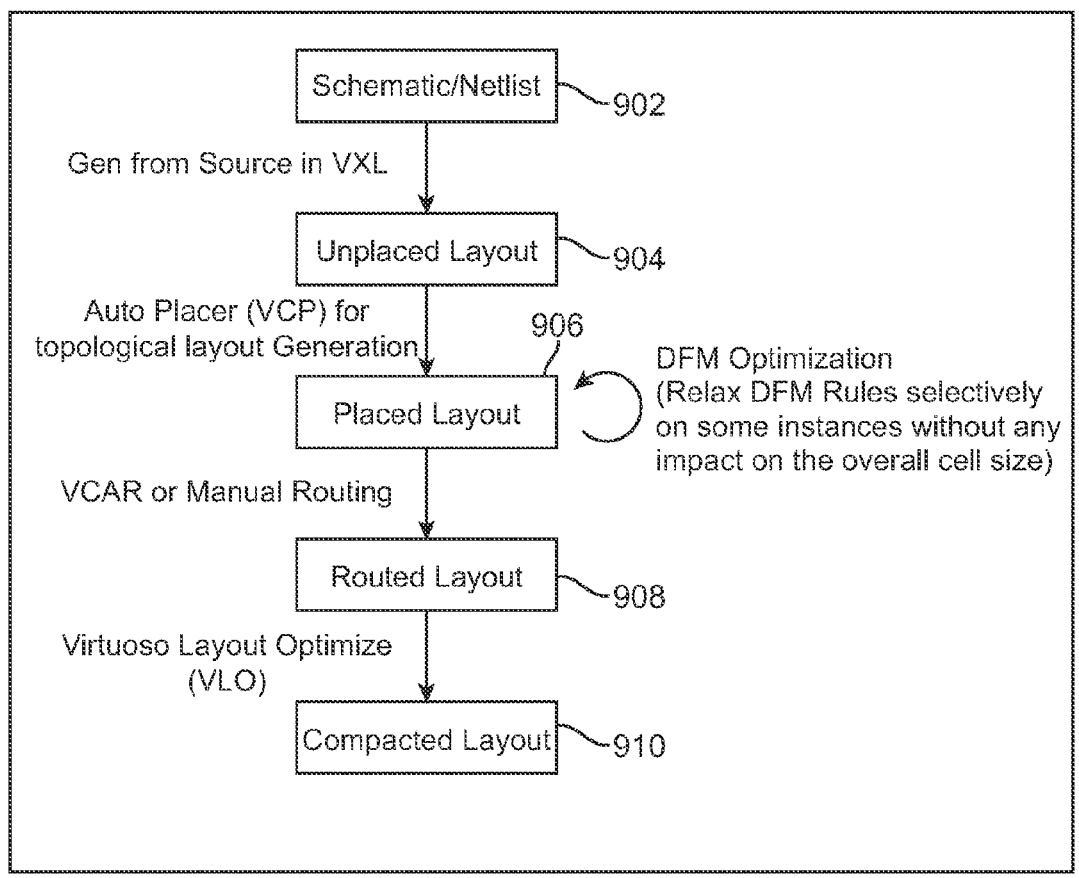
FIG. 9 illustrates using intelligent DFM cells in an electronic design flow according to some embodiments of the invention.

An example flow using DFM Intelligent QCells is described in FIG. 9. At 902, the process begins by receiving or identifying a schematic or nelist that is to be operated upon. Any suitable design file format may be employed.

At 904, an unplaced layout is generated. This action may be implemented through automatic layout generation capability (known as Gen from Source) available in Virtuoso XL (VXL) tool from Cadence Design Systems, Inc. of San Jose, Calif., USA.

At 906, a placed layout of the electronic design is generated. This action may be performed by an auto placer for topological layout generation. In some embodiments, it is at this stage of the design process flow in which DFM optimization may be implemented to relax design rules selectively on some instances without creating a negative impact on the overall cell size. Any or all of the above-described approaches may be taken to implement DFM optimization at this stage.

At 908, automated or manual routing may be performed to generate a routed layout. At 910, layout optimization may be performed to generate a compacted layout of the IC design.

Different variations can be used depending on the type of designs, e.g., Standard Cell designs, Memories etc.). For example, one or more additional DFM iterations may be used after routing step, if required, for further yield optimization.

In alternative embodiments, the present approach can be extended to the larger blocks of the designs, or applicable to specific regions of the design which are selected interactively.

In an embodiment, the system can automatically traverse/analyze the design hierarchically, and look at the placement of devices/instances and flag the regions of the layout where the DFM Rules could be relaxed without sacrificing the layout area and thus helping to achieve better yield.

If DFM Rules are relaxed on a particular Qcell instance, that instance's size can become larger. However, in one embodiment, it is being left to the layout designer to decide whether it is appropriate to do this relaxation without any impact on the overall cell/chip area in that particular case. The user can go with trial and error approach as he/she can switch back to previous set of DFM Rules or the default DRC values anyway for that instance later too in case of any problems. Alternative, the tool can study the relative placement of devices locally and automatically apply new DFM rules on individual Qcell instances interactively or in batch mode without any penalty on the overall cell size (i.e. chip area). This tool can also work as an interactive aid to flag any potential violations with the neighbouring devices/instances when we apply relaxed DFM rules on any instance in the design.

If it is desired to apply DFM rules on some specific instances after completing routing on the design layout, the tool will be made further intelligent to keep the contact/pin positions of the devices to be locked/fixed during relaxation of the DRC rules as per DFY recommendations. This is to ensure the integrity of connectivity in the final layout as-it-is and avoid any disturbance in the existing interconnects (created during routing).

The present invention can be applied to provide capability to a single device to have different gate or active layers. This facilitates the ability to have different gate layers, especially for different Boundaries. This can be implemented by adding a new DFM Rule specifying the specific layer to be chosen for gate or active/diffusion.

Further, all this won't need any special effort by the end user in terms of any complex programming, e.g., of SKILL or C code, as this will be fully embedded within the Qcells' engine using the novel concept of Class Parameter overrides in Qcells.

Therefore, with the current solution/methodology using the new feature of DFM Intelligent Qcells, the layout designer will not need to flatten their parameterized MOS devices (e.g., Qcells) just to try different geometric considerations for optimizing yield. This ensures that the complete connectivity is maintained as-it-is during all the potential trials of application of different DFM rules for optimizing yield interactively and backannotation with the schematic is maintained throughout in the process.

Moreover, since QCells are parameterized devices, there is no need to preserve different variations of their masters too. The whole thing has been implemented using a simple concept of class parameter overrides in Qcells as the basic DRC rules are internally being overidden on a per instance basis depending on the DFM rules being applied on that instance.

This is a simple interactive feature released in Qcells which provides immense power in the hands of the layout designer to be able to try different possible geometries and multiple DFM/DFY rules for optimizing yield as much as possible with a highly intuitive use model.

System Architecture Overview

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of allowing relaxed design rules when implementing an integrated circuit design, comprising:

defining a design for manufacturing (DFM) rule, the DFM rule corresponding to an alternate design rule from minimum design rule check (DRC) rules;

defining a set of one or more of the DFM rules as a constraint group;

associating the constraint group with an intelligent design parameterized cell master;

applying the constraint group on an instance of the intelligent design parameterized cell master to an intelligent design cell to override a default DRC rule for the integrated circuit design; and performing layout of the integrated circuit design.

2. The method of claim 1 in which the intelligent design cell comprises either a Ouick Cell (QCell or a Parameterized cell (Pcell).

3. The method of claim 2 in which the constraint group is stored as a class parameter.

4. The method of claim 1 in which the DFM rule and the constraint group information are stored in a technology library.

5. The method of claim 4 in which the DFM rule is technology specific.

6. The method of claim 1 in which the DFM rule or constraint group provides a different level of relaxation compared to a corresponding DRC rule.

7. The method of claim 1 in which the DFM rule comprises a minimum spacing rule, minimum extension rule, or minimum enclosure rule.

8. The method of claim 7 in which the minimum spacing rule, minimum extension rule, or minimum enclosure rule comprises any one of a poly end cap rule, active to poly spacing rule, poly to poly spacing rule, active enclosure of contact rule, metal enclosure of contact rule, poly to contact spacing rule, or an MOS-specific DRC rule.

9. The method of claim 8 in which different constraint groups are chosen for different DFM rules.

10. The method of claim 8 in which a single constraint group comprises multiple DFM rules.

11. The method of claim 1 in which the act of applying the constraint group on the instance of the intelligent design cell master to the intelligent design cell is performed at time of device generation.

12. The method of claim 1 in which multiple iterations of the method is performed during layout processing of the integrated circuit design.

13. The method of claim 1 in which the method is applied to specific regions of the integrated circuit design.

14. The method of claim 1 in which the integrated circuit design is traversed hierarchically to flag areas for which the DRC rules can be relaxed without sacrificing layout area.

15. The method of claim 1 in which the integrated circuit design is relaxed without increasing layout area.

16. A computer program product comprising a tangible computer usable medium having executable code to execute a process for allowing relaxed design rules when implementing an integrated circuit design, the process comprising:

defining a design for manufacturing (DFM) rule, the DFM rule corresponding to an alternate design rule from minimum design rule check (DRC) rules;

defining a set of one or more of the DFM rules as a constraint group;

associating the constraint group with an intelligent design parameterized cell master;

applying the constraint group on an instance of the intelligent design parameterized cell master to an intelligent design cell to override a default DRC rule for the integrated circuit design; and performing layout of the integrated circuit design.

17. The product of claim 16 in which multiple iterations of the process are performed during layout processing of the integrated circuit design.

18. A system for allowing relaxed design rules when implementing an integrated circuit design, comprising:

means for defining a design for manufacturing (DFM) rule, the DFM rule corresponding to an alternate design rule from minimum design rule check (DRC) rules;

means for defining a set of one or more of the DFM rules as a constraint group;

means for associating the constraint group with an intelligent design parameterized cell master;

means for applying the constraint group on an instance of the intelligent design parameterized cell master to an intelligent design cell to override a default DRC rule for the integrated circuit design; and means for performing layout of the integrated circuit design.

19. The system of claim 18 in which the constraint group is stored as a class parameter.

20. The system of claim 18 in which the DFM rule or constraint group provides a different level of relaxation compared to a corresponding DRC rule.

* * * * *